United States Patent
Egner et al.

(10) Patent No.: US 10,326,766 B2
(45) Date of Patent: Jun. 18, 2019

(54) METHOD AND APPARATUS FOR OPTIMIZING MOBILE EDGE COMPUTING FOR NOMADIC COMPUTING CAPABILITIES AS A SERVICE

(71) Applicant: Dell Products, LP, Round Rock, TX (US)

(72) Inventors: Will A. Egner, Cedar Park, TX (US); Liam B. Quinn, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 146 days.

(21) Appl. No.: 15/649,232

(22) Filed: Jul. 13, 2017

(65) Prior Publication Data
US 2019/0020657 A1    Jan. 17, 2019

(51) Int. Cl.
| | | |
|---|---|---|
| H04L 29/06 | (2006.01) | |
| G06F 21/57 | (2013.01) | |
| G06Q 20/36 | (2012.01) | |

(52) U.S. Cl.
CPC ............ H04L 63/10 (2013.01); *G06F 21/577* (2013.01); *G06F 2221/034* (2013.01); *G06Q 20/36* (2013.01); *H04L 63/08* (2013.01)

(58) Field of Classification Search
CPC ....... H04L 63/10; H04L 63/08; G06F 21/577; G06F 2221/034; G06Q 20/36
See application file for complete search history.

(56) References Cited

U.S. PATENT DOCUMENTS

| | | |
|---|---|---|
| 8,768,618 B1 | 7/2014 | Christie |
| 9,137,324 B2 | 9/2015 | Ims |
| 9,374,678 B2 | 6/2016 | Gupta |
| 9,459,339 B2 | 10/2016 | Mansour |
| 2005/0166041 A1 | 7/2005 | Brown |
| 2007/0112574 A1* | 5/2007 | Greene ................. G06F 9/5072 340/572.1 |

(Continued)

*Primary Examiner* — Amir Mehrmanesh
(74) *Attorney, Agent, or Firm* — Prol Intellectual Property Law, PLLC; H. Kenneth Prol

(57) ABSTRACT

A system and method for operating an edge compute advisory system comprising a network adapter to receive a compute work request from a client device seeking edge computing resources of a mobile edge computing system, wherein the compute work request includes processing resource requirements to meet the compute work request. A processor to determine a plurality of mobile edge computing systems within a neighborhood range of an estimated client device location, and the network adapter to receive advertisement messages indicating availability of the plurality of mobile edge computing systems and including an address location for secured historical compute trust references for each advertising mobile edge computing system. The processor executing machine readable executable code instructions of the edge compute advisory system to access and receive the historical trust references for a plurality of candidate mobile edge computing resources accessible to the client device location, and determine an optimal candidate mobile edge computing resources partner from among the plurality of candidate mobile edge computing systems based on a minimal level of trust category or rating for the mobile edge computing system.

20 Claims, 7 Drawing Sheets

(56) References Cited

U.S. PATENT DOCUMENTS

| | | | |
|---|---|---|---|
| 2009/0313318 A1* | 12/2009 | Dye | G06Q 30/00 |
| | | | 709/202 |
| 2013/0031240 A1 | 1/2013 | Byzek | |
| 2014/0368386 A1 | 12/2014 | Mansour | |
| 2015/0249907 A1 | 9/2015 | Gupta | |
| 2015/0332329 A1* | 11/2015 | Luo | G06F 16/29 |
| | | | 705/14.58 |
| 2016/0057124 A1 | 2/2016 | Boyle | |
| 2016/0283920 A1 | 9/2016 | Fisher | |
| 2017/0060574 A1* | 3/2017 | Malladi | G06F 8/70 |
| 2017/0064037 A1 | 3/2017 | Das | |
| 2017/0109685 A1 | 4/2017 | Bianchi | |
| 2018/0183855 A1* | 6/2018 | Sabella | H04L 67/04 |

\* cited by examiner

| Compute | Internet Address | Company or Organization | Access radio Technology | CPU Core Units | Memory Available | Security and performance history address (Base 58 with check encode payload) |
|---|---|---|---|---|---|---|
| Cyber cafe 1 | 8.192.1.76 | Cloud Provider 1 | Wi-Fi, WiGig, LTE Unlicensed | 3 | 6 Gbytes | 1hvzSofGwT8cjb8JU7nBsCSfEV QQX5u9CL |
| Carrier cloud services 1 | 32.0. 196.70 | Carrier 1 | Wi-Fi, LTE | 1 | 2 Gbytes | 1LQoTPYy1TyERbNV4ZZbhEmgy fAipC6eqL |
| Carrier cloud services 2 | 70.192. 0.65 | Carrier 2 | Wi-Fi, LTE | 1 | 2 Gbytes | 1FvRHWhHBBZA8cGRRsGIAeqE zUmjKJQWR |
| Cyber cafe 2 | 8.192.1.76 | Local Enterprise | Wi-Fi, LTE Unlicensed | 4 | 8 Gbytes | 1Q3q6taTsUIv3mMemEuQQJ9s GLEGaSjo81 |
| Web Services 2 | 96.127.1.9 4 | Cloud Provider 2 | LTE | 0.5 | 1 Gbyte | 1LqJZz1D9yHxG4cLkdujnqG5jN NGmPeAMD |

FIG. 4

METHOD AND APPARATUS FOR OPTIMIZING MOBILE EDGE COMPUTING FOR NOMADIC COMPUTING CAPABILITIES AS A SERVICE

FIELD OF THE DISCLOSURE

The present disclosure generally relates to security of data accessed by mobile information handling systems, and more specifically to providing for authorized access to reliable remote computing capabilities via a mobile edge computing system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may require additional computing resources to assist with task completion.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 4 is a graphical diagram illustrating a mobile edge compute system advertisement message according to an embodiment of the present disclosure;

The use of the same reference symbols in different drawings may indicate similar or identical items.

DETAILED DESCRIPTION OF THE DRAWINGS

Figure 1:
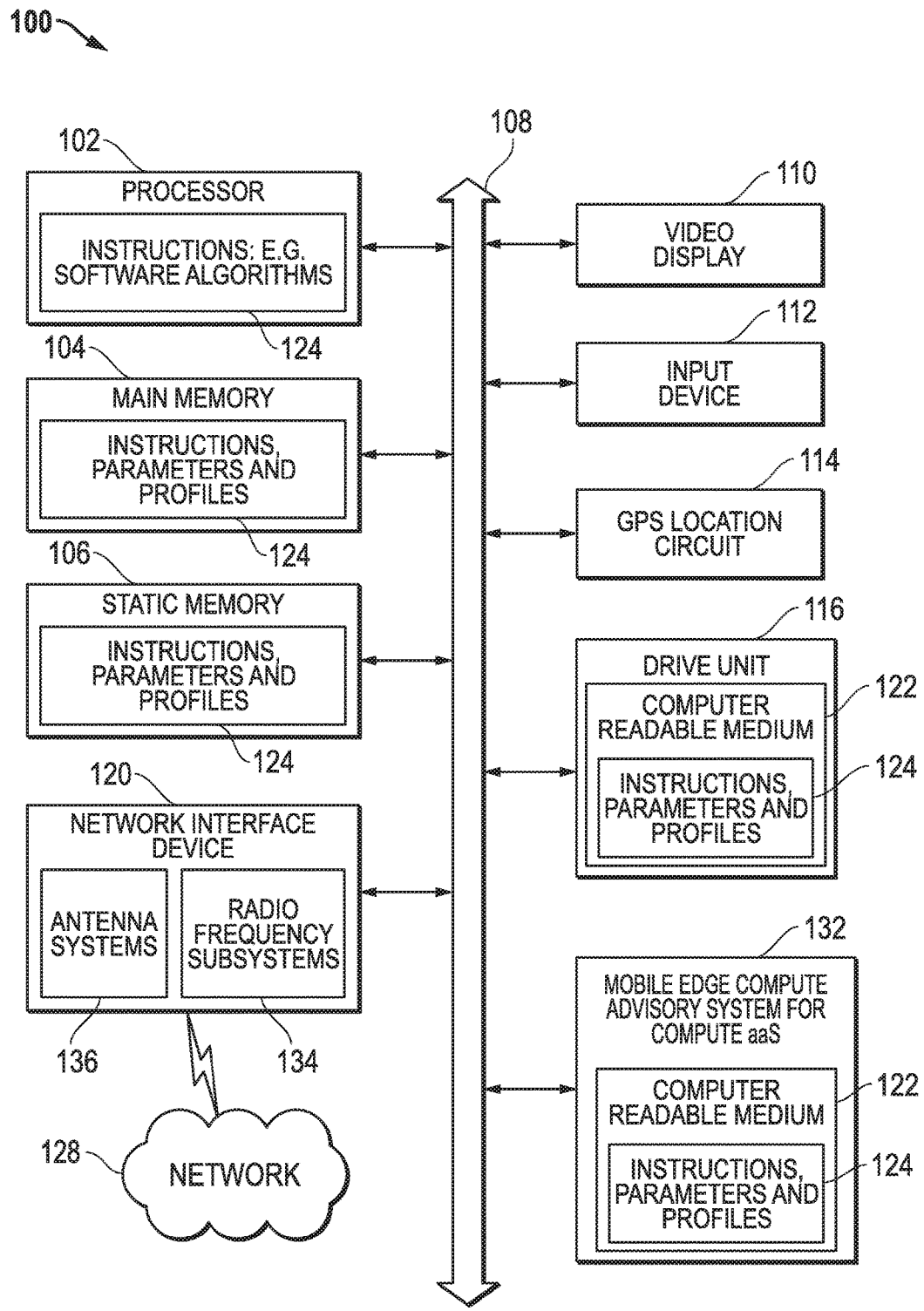
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As mobile computing infrastructure evolves worldwide to enable mobile information handling systems to transmit and receive larger amounts of data more quickly and easily while on the move, tasks previously completed only on stationary information handling systems are now being completed on mobile devices. This may include extended computing at everyday items including Internet of Things (IoT) systems that may monitor, provide services or information, or operate to control other systems at extended locations through places of work, residence, public spaces, or elsewhere. With many of these systems, there is a competing need to keep mobile devices lightweight and decrease battery consumption. One solution to these contrasting needs is to make competing services previously confined to a single information handling system (stationary or mobile) available on a plurality of computing resources located near where users or client information handling systems may operate. These services may be available, on command, via a plurality of mobile edge computing systems connected to the cloud and a plurality of gateway devices for local connectivity to the client information handling systems, including IoT devices, thin client systems, mobile information handlings systems, or the like.

In one such a system embodiment, called a nomadic computing services system, each subscriber to the nomadic compute system or member of an enterprise providing nomadic compute resources may have access to enhanced computing capabilities through any client information handling system. The client information handling system may be mobile information handling system or thin client device that the subscriber may use to access one or more mobile edge computing systems via a wireless gateway or other connection. In an example embodiment, the nomadic computing services system may be subscriber based and digital payment may be made for compute resources provided as well as for edge compute advisory services provided according to embodiments discussed herein. Further, some portion of compensation may be provided to utilize security technology to ensure accurate rating capabilities of edge compute systems such as payment for block chaining of data such as historical trust references discussed further herein. Another system embodiment may involve an enterprise operating a distributed computing services system for users of the enterprise or for outside users with permission. In such an enterprise system, edge compute selection policy may be provided from administrators of the enterprise or other organization for determination of optimal mobile edge compute partners from among the plurality of available mobile edge computing devices at or near a location.

An edge compute advisory system according embodiments herein may operate via an authentication server or edge node which may act as a broker for available edge compute resources near a location. In other aspect, some or all of an edge compute advisory system may operate on a client information handling system seeking edge compute services. Edge compute resources may advertise availability and provide historical trust references of various performance parameters. Based on this, an optimal one or more edge compute systems may be partnered with a client information handling system. In such a way, a reliable and effective compute as a service (Compute aaS) system may be provided for client information handling systems, IoT devices, thin clients, or may even be accessible by a user having no computing system but only some type of authenticating capability such as biometric access via a local portal or a smartcard detectable at a location.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, an IoT device, a wireless gateway, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), non-volatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

FIG. 1 shows an information handling system 100 capable of administering each of the specific embodiments of the present disclosure. Information handling system 100 may execute code instructions for all or any portion of edge compute advisory system 312 according to embodiments described herein. For example, the information handling system 100 can represent a gateway device operating as wireless network access point located anywhere within a network of access points or may also represent aspects of a client information handling system in communication with the gateway device. A gateway device may execute instructions via a processor for wireless access to a network of mobile edge computing systems that may provide Compute aaS services for payment or as part of a distributed computing resource capability for an enterprise or other organization. In some embodiments, mobile edge computing systems may be located near the edge and connected by one or a few hops from a wireless gateway device. In other embodiments, the wireless gateway devices may include mobile edge computing capability that is available and may also provide additional links to other mobile edge computing devices via one or more hops. One or more mobile edge computing devices may serve as a broker node to collect compute availability advertisements and access data to allow for accessing historical trust references for local mobile edge computing systems in some embodiments. In other embodiments, an authentication server located via cloud connection may implement one or more aspects of the edge compute advisory system 132.

The edge compute advisory system 132 of various embodiments of the present disclosure may operate in some example embodiments as a software agent, in whole or in part, within a client information handling system, or at a gateway device or other wireless network access point, or at one or more mobile edge computing systems offering compute service capabilities. Other portions of the edge compute advisory system 132 may operate on a broker node mobile edge computing system or gateway device, at remote server systems, or within mobile client information handling systems. Information handling system 100 may represent any of the above aspects of the systems which operate, communicate with, or utilize the edge compute advisory system 132 executing code instructions of any portion of the edge compute advisory system 132 according various embodiments of the present disclosure. Information handling system 100 may also represent a networked server or other system and administer some or all aspects of the edge compute advisory system 132 via instructions executed on a processor according to various embodiments herein involving remote operation of such systems.

For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets of instructions to perform one or more computer functions.

Information handling system 100 can include devices or modules that embody one or more of the devices or execute instructions for the one or more systems and modules described above, and operates to perform one or more of the methods described above. The information handling system 100 may execute code instructions 124, including that of the edge compute advisory system 132, that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the edge compute advisory system 132, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a video display 110. The video display 110 in an embodiment may function as a liquid crystal display (LCD), an organic light emitting diode (OLED), a flat panel display, a solid state display, or a cathode ray tube (CRT). Additionally, the information handling system 100 may include an alpha numeric input device 112, such as a keyboard, and/or a cursor control device, such as a mouse, touchpad, or gesture or touch screen input, and a GPS location circuit 114 capable of measuring a geographic location in three-dimensions, a velocity, and an acceleration of a mobile information handling system.

The information handling system 100 can also include a disk drive unit 116. The information handling system 100 can also represent a server device whose resources can be shared by multiple client devices, or it can represent an individual client device, such as a desktop personal computer, a laptop computer, a tablet computer, or a mobile Smartphone.

Network interface device 120 represents a NIC disposed within information handling system 100, on a main circuit board of the information handling system, integrated onto another component such as processor 102, in another suitable location, or a combination thereof. The network interface device 120 can include another information handling system, a data storage system, another network, a grid management system, another suitable resource, or a combination thereof. Network interface device 120 in an embodiment may operably connect to a network 128. Connection to network 128 may be wired or wireless.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless adapter 120 may include one or more radio frequency subsystems 134 with transmitter/receiver circuitry, wireless controller circuitry, amplifiers and other circuitry for wireless communications. The wireless adapter 120 may also include antenna system 136 which may be tunable antenna systems for use with the system and methods disclosed herein. The radio frequency subsystems 134 include wireless controllers to manage authentication, connectivity, communications, power levels for transmission, buffering, error correction, baseband processing, and other functions of the wireless adapter 120.

The information handling system 100 can include a set of instructions 124 that can be executed to cause the computer system to perform any one or more of the methods or computer based functions disclosed herein. For example, instructions 124 may execute an edge compute advisory system, software agents, or other aspects or components. Similarly instructions 124 may execute the edge compute advisory system disclosed herein for determining optimal mobile edge computing systems to be partnered with client information handling systems issuing compute work requests. Access to a mobile edge computing systems may be provided based on determining an available MEC system is located within a preset threshold distance such as a wireless range or a present limit on a number of hops from an estimated location of the client information handling system. Optimal mobile edge partner MEC systems may be selected by the edge compute advisory system based on several parameters as discussed further in embodiments herein.

Various software modules comprising application instructions 124 may be coordinated by an operating system (OS), and/or via an application programming interface (API). An example operating system may include Windows®, Android®, and other OS types known in the art. Example APIs may include Win 32, Core Java API, or Android APIs.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a PDA, a mobile information handling system, a wearable computing device, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The disk drive unit 116 and the edge compute advisory system 132 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124 including a plurality of block chains, where each block chain includes historical trust reference data for an edge compute system as well as for a single subscriber client computing device system in various embodiments. Further, static memory 106 may have storage for a digital wallet or other electronic payment capability. The disk drive unit 116 and static memory 106 also contain space for data storage. Further, the instructions 124 may embody one or more of the methods or logic as described herein. For example, instructions relating to the edge compute advisory system software algorithms may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the edge compute advisory system may be executed locally or remotely. For example, portions of the edge compute advisory system may be executed at a mobile edge computing system broker node while other portions of the edge compute advisory system may be executed at a remotely located authentication server. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The edge compute advisory system 132 and the drive unit 116 may include a computer-readable medium 122 such as a magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include an edge compute advisory system 132 that may be operably connected to the bus 108. The edge compute advisory system 132 computer readable medium 122 may also contain space for data storage. The edge compute advisory system 132 may perform tasks related to determining an optimal mobile edge compute partner after determining the client entity requesting access is located within a preset threshold distance from one or more candidate edge compute systems and that parameters of trust and performance are met. The edge compute advisory system 132 may reside in a mobile edge computing gateway device in communication with a mobile information handling system and with one or more cloud computing resources. The memory 104 may store a subscriber's nomadic computing data, and the processor 102 may operate to perform code instructions of a nomadic computing service related to providing Compute aaS services to subscribers or enterprise participants. In other embodiments, the computing data and processing capabilities of the nomadic computing service may reside outside the information handling system 100, and the edge compute advisory system may operate to securely communicate with historical trust references as between a candidate mobile edge compute systems as well as a client information handling system.

The edge compute advisory system 132 residing within either a client information handling system requesting compute as a service or within a broker node of a mobile edge computing system in various embodiments may control or recommend access to certain mobile edge computing services by determining capable and trustworthy edge compute systems for a requesting user client system or IoT device. In doing so, the edge compute advisory system 132 may receive from a client information handling system, a compute work request for access to mobile edge computing services. The compute work request may include a user identification, a task type, a time required, CPU units needed, memory required, measured radio connection listing or QoS determinations, power state, or even a measurement of the geographical location of the requesting client mobile information handling system. In some aspects an encryption key may be included to provide access to user client historical trust references. The edge compute advisory system may collect advertisement messages from available mobile edge computing systems including resources available, location, cost, and an encryption key to access historical trust references for the mobile edge compute system candidate. The edge compute advisory system 132 may access a plurality of block chains stored in the memory 104 of a system storing the historical trust references, and identify the block chain associated with the candidate mobile edge computing system. Each block chain may contain a plurality of "blocks," or time-stamped records of edge computing performance data for a mobile edge computing system. Each block may be encrypted, and may include a plurality of parameters indicating details or statistics about performance by a candidate mobile edge computing system at the time of the time-stamp as discussed in embodiments of the present disclosure. In some embodiments, an edge compute advisory system or a mobile edge compute device may access a block chain associated with a client device for historical trust references such as payment record.

The memory 104 may store a plurality of block chains, and may be located at a mobile edge computing system serving as an authentication node or at some cloud computing resource such as an authentication server. In an example embodiment, the memory 104 may be located within a remotely located authentication server in communication with the edge compute advisory system.

Once the proper block chain has been identified, the edge compute advisory system 132 may use the received encryption key to decrypt the identified block chain. The memory 104 in an embodiment may store historical trust references under a plurality of encryption schemes besides block chains in other embodiments. In one example embodiment, a client mobile information handling systems may include a edge compute advisory system 132 agent or API that receives an encryption key identifying the encryption scheme assigned to a candidate mobile edge computing system block chain. Upon requesting access to that edge computing system's computing services, the edge compute advisory system 132 agent operating on the client mobile information handling system may transmit this previously received encryption key to a secure location storing the block chains to decrypt the block chain identified as being associated with the candidate mobile edge computing system for the computing services requested.

Once the mobile edge computing system's historical trust references have been recovered from the decrypted block chain, the edge compute advisory system 132 in an embodiment may estimate the suitability of a mobile edge computing system to provide computing services to a client information handling system requesting such services. Risk of malware, security risk, chances of successful completion, suitable available resources, chances of completion within a required time, cost considerations, power consumption by the client system to communicate with an edge compute system, reliability of connectivity, or other factors of a trusted compute policy may be assessed according to various embodiments herein. In an embodiment, the edge compute advisory system 132 may communicate with the main memory 104, the processor 102, the video display 110, the alpha-numeric input device 112, the GPS location circuit 114, and the network interface device 120 via bus 108, and several forms of communication may be used, including ACPI, SMBus, a 24 MHZ BF SK-coded transmission channel, or shared memory.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
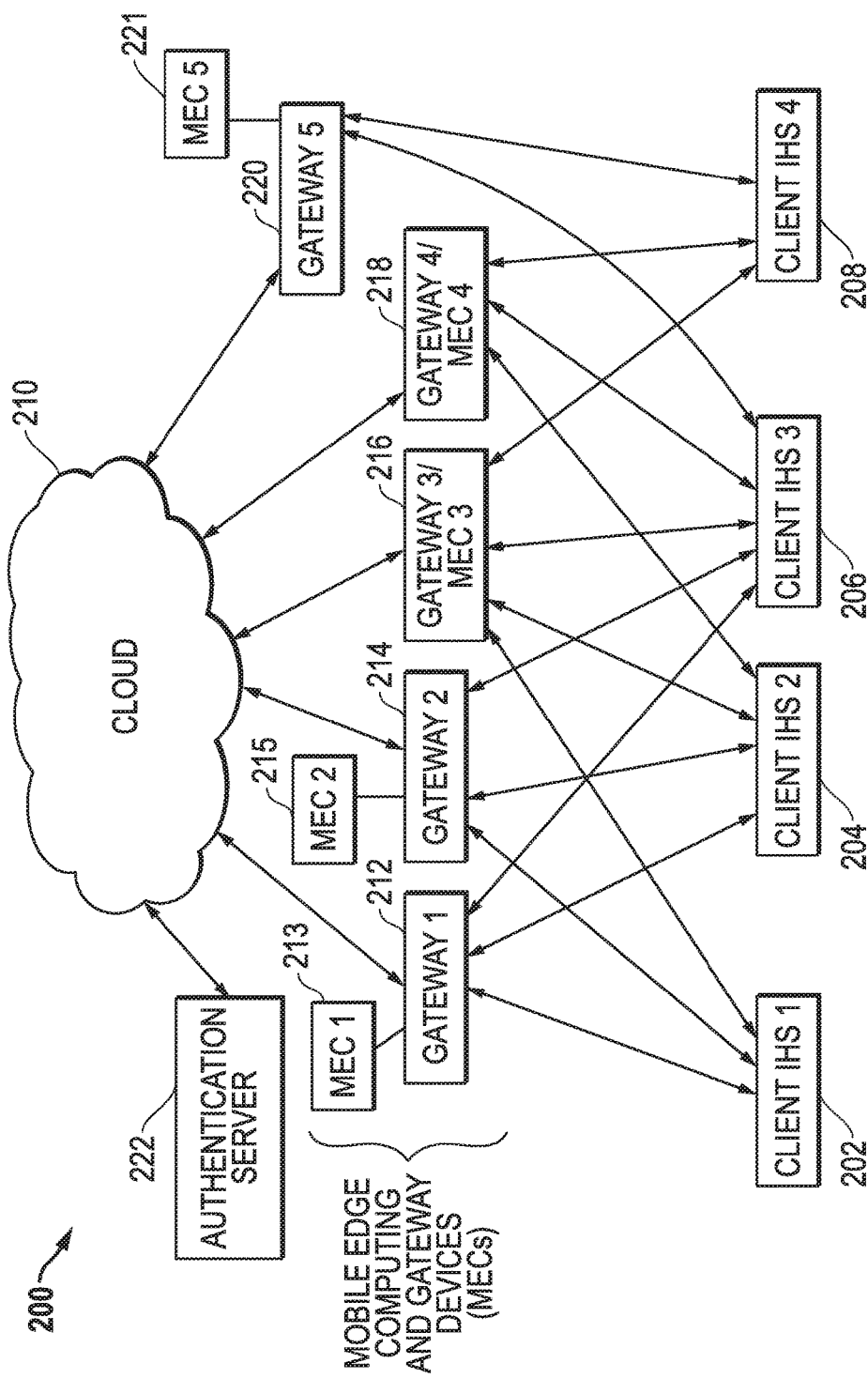
FIG. 2 is a block diagram illustrating a plurality of mobile edge computing resources in an area of an information handling system according to an embodiment of the present disclosure.

FIG. 2 is a block diagram illustrating a mobile edge computing (MEC) network 200 and its availability at the edge of the internet to local information handling systems according to an embodiment of the present disclosure. Client information handling systems 202, 204, 206, and 208 may be located within range and have access to mobile edge compute resources 213, 215, 216, 218, and 221 via a plurality of wireless gateways device 212, 214, 216, 218 and 220 according to various embodiments. Client information handling systems 202, 204, 206, and 208 may be an IoT device, a thin client information handling system, a smartcard, a mobile information handling system, or any other information handling system with wireless access and seeking mobile edge computing resources. It is understood that a mobile edge computing system may be located near a gateway such as MEC 1 at 213 and Gateway 1 at 212 in some embodiments. MEC resources 213, 215, 216, 218, and 221 may include a locally placed computing system or server near one or more access points, base stations, or other edge transmitters (gateways 212, 214, 216, 218 and 220) making edge computing resources available to a wireless area. In other embodiments, a mobile edge computing system may be co-located as part of a wireless gateway such as shown with Gateway 3/MEC 3 at 216 and Gateway 4/MEC 4 at 218 whereby the wireless gateway may provide one option for mobile edge computing services to client information handling systems.

In an example embodiment, a broker node may operate to run all or part of the various aspects of the edge compute advisory system and may be one of the MECs 213, 215, 216, 218, and 221 or a gateway 212, 214, 216, 218 and 220 with compute capability. For example, the designated broker node MEC may receive a compute work request from a client information handling system such as an IoT device or thin client, seek and receive advertisement messages from MECs, access historical trust references, and determine an optimal edge compute partner to satisfy the compute work request according to embodiments herein. Various criteria for selecting one or more optimal edge compute partners may be used and may be issued, for example, as an enterprise trusted compute policy to a broker node in some example embodiments. In another aspect, client information handling systems 202, 204, 206, and 208 may instead operate all or part of the various aspects of the edge compute advisory system when seeking edge compute resources. A client information handling system may determine needs for computing resources, issue a compute work request, and solicit advertisement messages, access historical trust references, and determine a optimal edge compute partner to satisfy the compute work request. In an example embodiment, Compute as a Service subscribers may have an edge compute advisory system determine optimal edge compute partners based in part on cost to compute. This and other factors may be established in a trusted compute policy, which may be modified in a client information handling system through settings by a user or administrator.

Each wireless gateway device 212, 214, 216, 218 and 220 may be connected to an internet backbone and cloud network 210 for connection to internet resources or other cloud connected resources. For example, cloud connectivity 210 may be via wired Ethernet connectivity to backhaul connection of the greater internet infrastructure. Additional resources may include an authentication server 222 which also may house or run all or part of the various aspects of the edge compute advisory system. For example, an authentication server may provide trusted compute policy from an enterprise or other organization or updates to the same to an edge compute advisory system. In other embodiments, the authentication server may be a secure location where historical trust reference data may be stored, such as that secured by block chaining, and made available to the edge compute advisory system. In other embodiments, historical trust references may be stored at another location such as one closer to a broker node. In yet another embodiment, the authentication server 222 may administer one or more MECs such as in an enterprise setting or with a Compute aaS setting. For example, authentication server 222 may monitor or even process digital payments to MECs from client information handling systems and attribute one or more portion of the payments for the edge compute advisory services provided by a broker node, if any is used with Compute aaS. In other embodiments, some portion of payment for the Compute aaS may be attributed to data miners who provide block chaining services for securing historical trust references for MECs or for client information handling systems in embodiments that use block chaining.

Each of the client information handling systems 202, 204, 206, and 208 may wirelessly communicate with any of multiple wireless gateway devices 212, 214, 216, 218 and 220. In some cases, plural wireless links may be used. Wireless communication may be via WWAN connectivity, WLAN connectivity, WPAN connectivity or any other wireless link protocols. For example, some or all of the wireless gateway device 212, 214, 216, 218 and 220 may be LTE or WCDMA base stations operating in 2G, 2.5G, 3G, 4G, 4.5G, 5G or other 3GPP protocols with client information handling systems 202, 204, 206, and 208. Client information handling systems 202, 204, 206, and 208 may also have one or more wireless transmitters in some embodiments.

Figure 3:
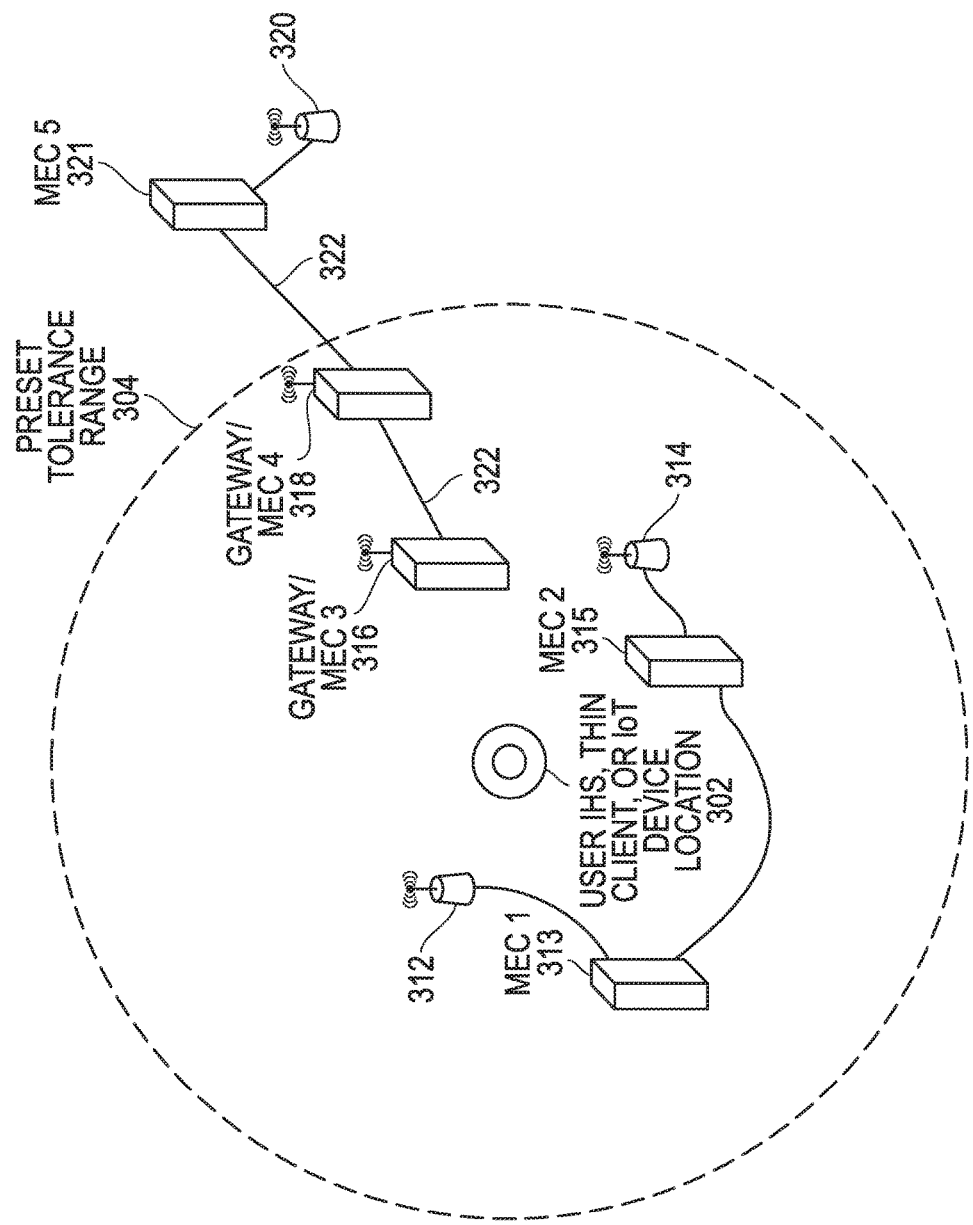
FIG. 3 is a block diagram illustrating accessibility of a plurality of mobile edge computing resources in an area of an information handling system according to another embodiment of the present disclosure.

In other embodiments, some or all of the wireless gateway device 212, 214, 216, 218 and 220 may be Wi-Fi or WiGig access points for administering one or more WLAN wireless links with client information handling systems 202, 204, 206, and 208. In further embodiments, low power protocols may be used including 6LoWPAN, ZigBee, or similar WPAN protocols for interface between client information handling systems that are IoT devices 202, 204, 206, and 208 and some or all of the wireless gateway devices 212, 214, 216, 218 and 220. Wireless links may be available from wireless gateway devices 212, 214, 216, 218 and 220 via WLAN which may be connected by wireline or Ethernet connections to a wider external network such as cloud 210. For example, wireless network access points may be connected to a wireless network controller and an Ethernet switch. Wireless communications with wireless gateway devices 212, 214, 216, 218 and 220 may be via standard protocols such as IEEE 802.11 Wi-Fi, IEEE 802.11ad WiGig, IEEE 802.15 WPAN, or emerging 5G small cell WWAN communications such as eNodeB, or similar wireless network protocols. Alternatively, other available wireless links via wireless gateway devices 212, 214, 216, 218 and 220 may include macro-cellular connections via one or more service providers. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like FIG. 3 is a block diagram illustrating a mobile edge computing (MEC) network and its availability to a local information handling system 302 according to another embodiment of the present disclosure. During operation of a mobile edge compute advisory system according to embodiments herein, a compute work request may be received from a client information handling system 302. In other embodiments, the client information handling system 302 may operate some or all of the mobile edge compute advisory system and may generate a compute work request.

The edge compute advisory system may then utilize a communications channel to access advertisement messages from mobile edge computing systems such as MEC 1 313, MEC 2 315, MEC 3 316, MEC 4 318, of MEC 5 321. A general advertising services channel may be used and assigned a channel within a WiFi link, LTE link, or wired links 322 that may connect one or more MEC systems such as 316 and 318 or 318 and 321. The general advertising services channel may be an open channel of data to transmit advertisement messages about MEC availability and reliability. An information handling system 302 seeking available MEC systems may access this channel with or without authentication required. In the case of authentication used, a subscriber authentication or an enterprise participant authentication may reside with the information handling system 302 for access to this channel. Further, connectivity to any selected optimal mobile edge compute partner determined by the edge compute advisory system may be wireless through an access points, base stations, or other wireless transceivers as shown at 312, 314, 316, 318, and 320. Transceivers 316 and 318 may be combined with a MEC system according to some embodiments so that one available MEC system resides at the wireless gateway transceiver.

Information handling system 302 according to various embodiments herein may be part of an enterprise system providing edge computing resources. For example, information handling system 302 may be IoT devices seeking additional computing resources, may be thin clients of users within the enterprise, may be mobile information handling systems operating within the enterprise. In another aspect of the embodiments herein, information handling system 302 may be part of a subscriber based mobile edge computing service and may be a thin client system, a smart card or other user identification, or some other mobile information handling system. The edge compute advisory system assisting in finding mobile edge computing systems may operate via a broker hub at one or more MEC devices, may operate from the information handling system 302, or may operate in parts from remote servers.

Upon seeking advertisement messages relating to MEC availability within an area servicing the information handling 302, the edge compute advisory system limits the range 304 of MEC systems from which edge computing resources are sought. This range 304 is shown as a preset tolerance range 304 in FIG. 3. The range may be limited by wireless range from the client user information handling system, IoT device, or the like 302 to wireless adapters in a local area of operation. In addition, the preset tolerance range 304 may be further defined by a limitation on the number of hops 322 permitted or the distance of hops 322 to reach a candidate mobile edge computing system.

For example, the wireless range may limit available MEC systems based on diminishing wireless link QoS levels or wireless range. For example, wireless transceiver 320 may be too distant to effectively provide for wireless connectivity to MEC 5 321 or any other MEC device (not shown) linked via transceiver 320. By contrast, transceiver 312 may provide access to MEC 1 313 as well as access to MEC 2 315 via on hop 322 when MEC 1 313 and MEC 2 are networked. Likewise transceiver 314 may provide access to MEC 2 315 as well as a one hop link 322 to MEC 1 313.

In another embodiment, combination transceiver/MEC 3 316 may provide edge compute capabilities to information handling system 302 as well as hops 322 to transceiver/MEC 4 318 and a second hop to MEC 5 321. However, in one embodiment, the preset tolerance range 304 may not permit two hops 322 due to communication delays or computing resources consumed such that MEC 5 321 is not considered available and will not be considered by the edge compute advisory system. The number of hops permitted under a preset tolerance range may be one hop as shown or may be any number of limited hops 322 or overall distance of the communications across the hops 322. Further, wireless gateway/MEC 4 318 may provide for a lower QoS wireless link capability due to its distance as compared to a wireless connection via transceiver/MEC 3 at 316. This lower wireless QoS level at 318 may consume additional power to communicate with wirelessly, and may consume additional processing by the information handling system. Thus, the number of permissible wired hops 322 may be further limited based on the strength of the wireless connection. Thus, MEC5 321 may not be available via wireless connection to transceiver/MEC 3 316 due to too many wired hops or via wireless connection to transceiver/MEC 4 318 having lower wireless signal quality further limiting allowed hops 322. It is contemplated some or all of the MEC systems MEC 1 313, MEC 2 315, MEC 3 316, MEC 4 318, of MEC 5 321 available in an area may be networked wirelessly by a mesh network, non-mesh network, or may only be networked via cloud connectivity. Added distance by wireless connection or hops 322 may limit the tolerance range 304 for a location of client information handling system 302. The edge compute advisory system will therefore limit advertisement messages considered to those from MEC systems within the preset tolerance range to the client information handling system 302.

FIG. 4 is a block diagram illustrating a collection of advertisement messages for a list of mobile edge computing systems according to an embodiment of the present disclosure. Table 400 includes a list of mobile edge computing systems and related advertisement messages received by an edge compute advisory system. The advertisement messages may be solicited by the edge compute advisory system on behalf of the client information handling system in response to a request for edge computing resources. In other instances, the advertisement messages may be broadcast by available edge computing systems and accessed by an edge compute advisory system via a general advertising services channel made available for such a purpose.

In an example embodiment, the table 400 represents a list of available MEC systems within an area of the requesting client information handling system. Those systems not available at a particular time or outside a preset tolerance range may not appear in a list of available MEC systems. Thus, systems listed in table 400 may be considered candidate MEC systems that are being rated or otherwise assessed by the edge compute advisory system of the present embodiments. In a first embodiment, an advertisement message 404 may be received by the edge compute advisory system for "Cyber café 1". The advertisement message may include the name of the MEC system, an internet address, a providing company or organization, radio technology by which the system may be accessed, and an encrypted security and performance history address. In a separate transmission, an encryption key may be provided for "Cyber café 1" to access a set of historical trust references that may be located at the security and performance history address. In an example embodiment, the historical trust references may be stored at the security and performance history address within a block chain for protection of the data. The radio technology by which the MEC system "Cyber café 1" may be accessed may include co-located transceiver or nearby transceiver systems that service "Cyber café 1". In this example, WiFi, WiGig, and LTE Unlicensed transceiver options may be available.

In a further aspect, the MEC system advertisement messages may include currently available computing resources as shown in columns 414 including core CPU units available and memory available. These compute capability aspects 414 are considered in determining the optimal edge compute partner or partners by the edge compute advisory system according to embodiments herein.

In other example embodiment, advertisement message 406 may be provided for a MEC system called "Carrier cloud services 1". It is noted that "Carrier cloud services 1" has fewer available CPU core units available and less memory available than "Cyber café 1". Advertisement message 408 is shown for MEC system "Cloud services 2". Advertisement message 410 is shown for MEC system "Cyber café 2". Advertisement message 412 is shown for MEC system "Web services 2".

As can seen from the listed advertisement messages for the available MEC systems in an area of a requesting client information handling system, varied levels of computing resources may be available. Further, access may be limited to particular wireless protocol types. In several embodiments described herein, a mobile edge compute advisory system may determine the encoded security and performance history address location by decoding the encoded secure address information from the advertisement message (for example, Base 58 with check encode payload). Then the mobile edge compute advisory system may access the relevant security and performance history address locations to obtain, and in some embodiments decrypt, the historical trust references stored there for each of the candidate MEC system. The historical trust references may be encrypted and subsequently decrypted according to a variety of encryption techniques including symmetric or asymmetric encryption.

In one example embodiment, the historical trust references may be stored in a block chain at the security and performance history address locations for security reasons. In a particular embodiment, the block chain is a distributed database of time-stamped records called "blocks." A block chain may grow by adding a plurality of blocks, where each block is linked to the other blocks to form a chain. In some aspects the number of blocks may be limited such that at some point a first block is eliminated with a new block added. Each block in a block chain may be added by a different entity or device simply by linking a new block to previously recorded blocks. Because each block links to a previous block, and all blocks may be generated by differing devices, and an early block within a block chain cannot be altered retroactively without altering all of the subsequent blocks that later followed and linked to that early block. This makes block chains inherently resistant to modification of each time-stamped record within the chain. Data miners may be utilized to encrypt the blocks of a block chain to provide algorithmic encryption of data contained therein. This algorithmic encryption of the block chaining may be computationally intensive. Accordingly, block chaining miners may in some aspects be compensated for creating the block chained data. A block chain based recording system may make recording and transmitting historical trust references for a plurality of MEC systems quicker, cheaper, and safer than traditional non-distributed systems with a central authentication server or encryption method that may be hacked.

Figure 5:
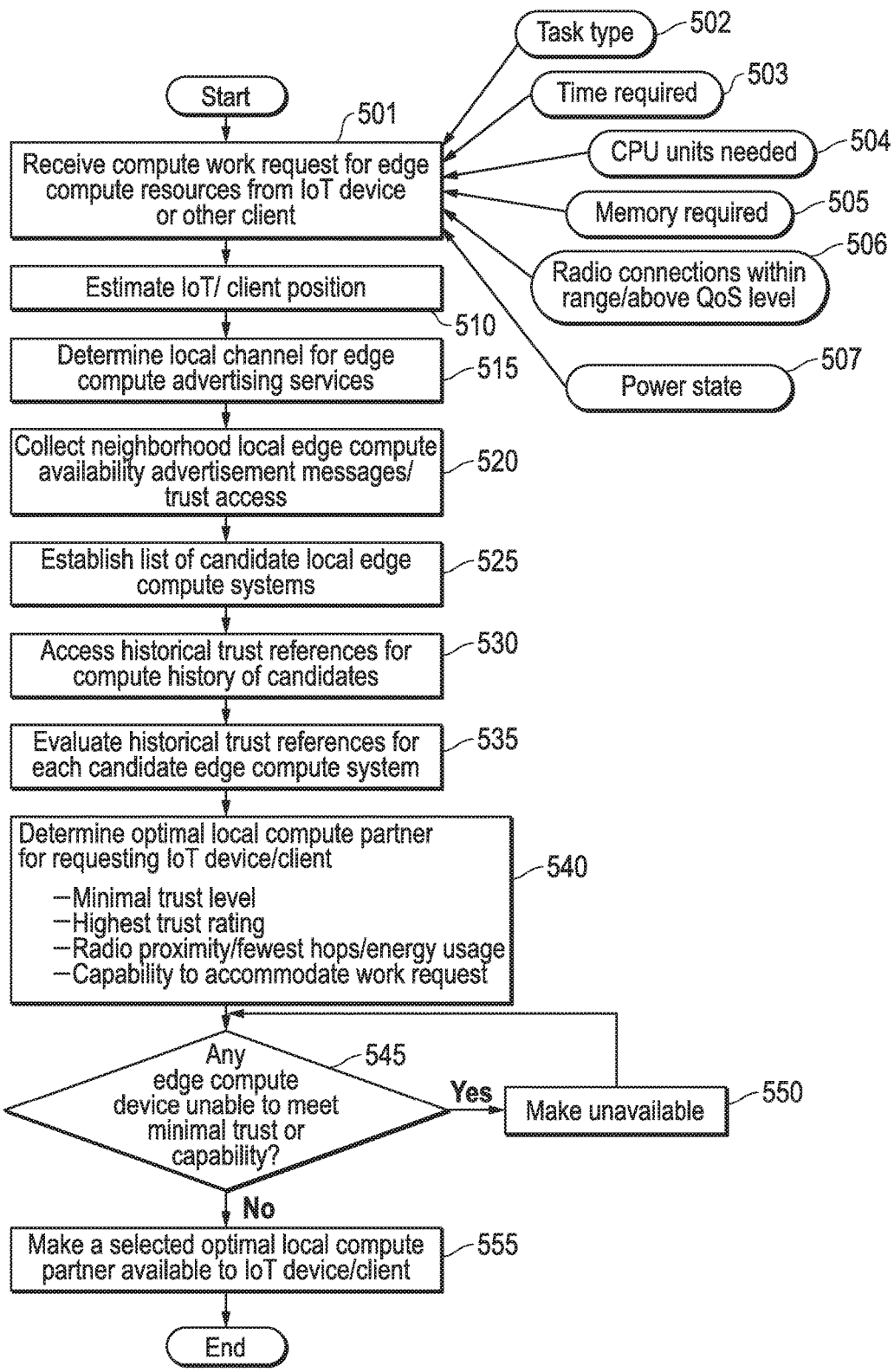
FIG. 5 a flow diagram illustrating a method of operating an edge compute advisory system for a client device according to an embodiment of the present disclosure.

FIG. 5 is a flow diagram illustrating a method of operating an edge compute advisory system to select one or more suitable MEC systems for satisfying a compute work request according to an embodiment of the present disclosure. At block 501, the edge compute advisory system may receive a compute work request from a client information handling system. A client information handling system in an area may be part of an enterprise or a subscriber for edge computing services and may detect a wireless link to a broker node executing instructions of the edge compute advisory system. As shown, the client information handling system may be an IoT device or any other client information handling system.

The compute work request may include several parameters of the additional computing work needed. For example, task type 502 may be identified. Task type may include data off-load, processing of the data, and packaging for upstream cloud transmittal for an IoT device or other device in one example embodiment. The data off-loaded may be sensor data of a variety of types. Such a task may require a particular level of both processing and memory. In other example embodiments, the compute work request may include a maximum time within which a task must be completed 503. In other embodiments, CPU units 504 or memory needed 505 may be transmitted with the compute work request to define resources necessary to complete the requested task or tasks. Additional data may be provided by the client information handling system relevant to available radios, connections within range, and QoS data 506 indicating which transceivers may have sufficient connectivity quality to be connections by which to conduct the mobile edge computing services. Finally, in some embodiments, power state 507 data may be provided for the remaining power level of a mobile information handling system or power level limits of an IoT device which may further limit available preset tolerance range or necessary shifting of computing work needed away from the client information handling system. These factors may be considered by the edge compute advisory system when determining one or more suitable MEC systems.

At 510, the edge compute advisory system may determine the location or receive detailed location information from the client information handling system or IoT device. This may include GPS positioning data or may include data of position relative to a plurality of transceiver systems based on numerous position determination techniques known in the art. Further, the client location relative to the available transceivers will be assessed to determine those wireless link options which are available to the requesting client information handling system. With this information, the edge compute advisory system may determine which possible MEC systems that fall within a preset tolerance range and may be considered for selection as an edge computing resources partner for the client information handling system.

Proceeding to 515, the edge compute advisory system determines a local channel that is available or designated for exchange of edge compute advertising services. The local channel may be a networked channel or a WLAN channel designated for communicating with MEC systems or corresponding access points or base stations to request advertisement messages detailing the availability, capability and trustworthiness of one or more MEC systems that may provide requested edge computing resources. In another embodiment, the MEC systems may each broadcast advertisement messages with encoded or encrypted information for accessing the historical trust references on that MEC system on a generic advertising services link. The edge compute advisory system may access the MEC system advertisements which are updated as to availability and current resources available periodically or continuously.

Through the edge compute advertising service, advertisement messages may be collected at 520 from available MEC systems within a preset tolerance range of the position of the client information handling system. The advertisement messages may include identifying information for the MEC system, details on available resources at an MEC system, and links to historical trust references as well as a key for decrypting historical trust reference information. Further information may be included in advertisement messages as described herein but may also include company or owner providing edge compute resources, subscriber information and availability in subscriber compute systems, cost that may be applicable to accessing compute services, electronic payment location or payment information, and similar data.

At 525, the edge compute advisory system may establish a list of candidate local mobile edge compute systems. Systems that are unavailable may not provide advertisement messages or the advertisement messages may indicate unavailability. These local MEC systems will not be listed in the candidate local MEC systems. Further, some parameters may eliminate other MEC systems advertising available local compute services including types of wireless connectivity to access the MEC system which may or may not be compatible with the requesting client information handling system. Other parameters to limit the list of candidate MEC systems may be limitations of number of hops allowed or limitations on reported QoS levels or reported data error rates in wireless communication with a wireless transceiver associated with accessing a MEC system. Once a list of candidate local MEC systems is established, flow may proceed to 530. In other embodiments, if a large plurality of MEC systems responds with advertisement messages for compute, filters may be applied to limit the number of candidate MEC systems. Those filter aspects may be applied based on costs, based on proximity restrictions, or may be limited based on simply a number of first come, first serve respondents.

The edge compute advisory system at 530 may decode and access secure locations for historical trust references for each candidate MEC system. The edge compute advisory system may establish a link to a secure IP address where the historical trust references are stored for each candidate MEC. In some embodiments, the historical trust references stored at the secure IP address location may be stored as block chains of data or otherwise encrypted for security. The candidate MEC systems will also need to have provided the edge compute advisory system, separately or as part of the advertisement message, access credentials for accessing the underlying historical trust reference data in various embodiments. In some example embodiments, a key for access to a block chain of historical trust references may be provided.

Once decrypted, the historical trust references include a report of a series of previous compute experiences with respect to the candidate MEC system. This may include ability to complete compute work requests, time of completion of an assigned task, reported errors, reported communication difficulties, incidents with security, billing issues, and other reportable aspects of the information handling system. Each block in an example embodiment may include reported data for an episode of compute services provided by the candidate MEC system. The historical trust references are reported by other client information handling systems and may include data relating to the original scope of the compute work request, the connectivity necessary to work with a client information handling system (hops, type of wireless connection, quality of connection, etc.), time of day, and other identifying information.

At 535, the edge compute advisory system may evaluate the historical trust references for each candidate MEC system. In doing so, the edge compute advisory system may flag any instances of failure to complete compute work requests, any reported incidents of security breaches or introduction of malware, any reported errors or time out episodes, reported payment problems or fraud, or other significant problems identifiable with the provision of the edge compute services. In one example embodiment, one or more instances of the above type events may place the candidate MEC system in an untrustworthy category. No reported events such as the above may place the candidate MEC system in a trustworthy category.

In other embodiments, a series of trustworthiness categories may be designated. For example, if a reported payment issue/fraud, security breach or malware introduction, or a failure to complete compute work requests is recent, a lowest trustworthiness categorization may be applied to the candidate MEC system. If on the other hand, a MEC system has once been subject to malware but the malware incident is older or is known to have been neutralized, one of the medium trustworthiness categorization may be assigned. Further, data errors or failure to complete a requested task within an allocated time may be substantial errors or they may be considered less severe but may nonetheless reduce a trustworthiness categorization below the highest trustworthiness categorization which may be applied to MEC systems with an unblemished record or which have very few incidents reported or which are old and less pertinent.

In another embodiment, the edge compute advisory system may create a trustworthiness rating from the historical trust references records for each candidate MEC for comparison. The trustworthiness rating may be established through application of any algorithm to assess performance of the candidate MEC system. Normalization and weighting factors may provide for comparison of various edge compute performance metrics received in the historical trust references. In an example embodiment, a percentage of on-time completion of contracted compute tasks without error and without security incidents may serve as rating level in one example embodiment relative to a total number of contracted compute tasks performed by an MEC system. For example, a trustworthiness rating value may be out of 100 or rated up to 10 based on the percentage of on-time completion. Such a trustworthiness rating may determined for an MEC system once it has been determined that no highly untrustworthy events such as recent malware or security breaches or failure to complete a contracted compute task have been reported to eliminate the candidate MEC system from consideration.

In one example embodiment, trustworthiness rating value may be weighted or modified by factors such as compute location proximity (as determined by wireless connectivity quality or number of hops), cost levels as applicable, or trust trend values relative to prior trustworthiness score. To apply multiple weighting values, the factors may be normalized at various levels depending on the attributed importance in the trusted compute policy implemented by the edge compute advisory system. The trusted compute policy may be provided by an enterprise administrative server in some embodiments or may be provided as default in other embodiments. A user or administrator may be able to modify the trusted compute policy to emphasize or de-emphasize aspects in some embodiments. In the latter example embodiment, a trust trend having increasing trustworthiness may be assessed by subtracting one or more previous trust scores at previous historical trust reference report time points from a current trust score to determine the change in trust rating over time. Based on the trust trend, an increase may indicate ongoing resolution of problems and a likelihood that the MEC system will satisfactorily perform the request compute tasks. The trust trend may be used to determine ranking or threshold levels to designate a candidate MEC system as an optimal edge compute trust partner.

Additional weighting factors may be multiplied into the determination of a trustworthiness rating value or a trust trend value including weighting factors such as an abundance of current processing capability or memory resources beyond the minimum necessary to complete the compute task. Thus, additional resources may be available if needed to complete the compute task in a time.

For an IoT device QoS levels or latency may be of greater concern where the client device is a low power system with limited computing resources if any. Further, power utilization may be of concern and weighting of the trustworthiness rating value calculation may be impacted by anticipated power consumption needed to communicate with a MEC system. A normalized value of QoS or anticipated latency relative to other candidate MEC systems may be used to influence the trustworthiness rating to assist in selecting MEC systems having less impact on power consumption in some example embodiments.

Upon determination of the trustworthiness categorization or trustworthiness algorithmic rating by the edge compute advisory system, flow may proceed to 540 for determination of an optimal edge compute partner for the requesting client information handling system. In one example embodiment, one or more optimal edge compute partners may be recommended for the candidate MEC systems that meet a minimum trust level such as a threshold trustworthiness categorization or a minimum threshold trustworthiness rating. In another embodiment, the edge compute advisory system may select one or more optimal edge compute partner based on those candidate MEC systems that have the highest trustworthiness category or trustworthiness rating. Additional aspects may be considered by the mobile edge compute advisory system at this time if not already considered in the weighting calculation of a trustworthiness score value. For example, further narrowing of MEC systems that may qualify as an optimal edge compute partner may be made according to radio proximity to a client information handling system or fewest hops to minimize latencies. In some example embodiments, such as for low power IoT devices or mobile client devices with a reported low power state, the highest QoS wireless link or the MEC with the least likely latency may be selected to minimize power expended by the client information handling system. The energy cost in communicating with the selected optimal edge compute partner when the compute work is being conducted may be minimized for the low power client information handling system. In other embodiments, where Compute aaS is implemented, ranking may be based on lowest cost. In yet other embodiments, a comparison between the current capacities of the candidate MEC to meet the requirements of the compute work request is made and ranking is conducted based upon the current compute or memory resources available at the candidate MEC. If resources above the level requested by the compute work request are available, then the candidate MEC system may be provided as a priority optimal edge compute partner in some embodiments.

Proceeding to 545, if the mobile edge compute advisory system detects that any candidate MEC system has current processing or memory resources insufficient to match those required by the client compute work request, then flow may proceed to 550. Similarly, if any candidate MEC system is determined to not meet a minimal trustworthiness level, flow may proceed to 550. At 550, the edge compute advisory system will make the candidate MEC system unavailable to the client information handling system. A highly untrustworthy candidate MEC system may be barred from utilization to protect the client information handling system.

In some embodiments, it is understood that the available processing and memory resources at MEC system may change dynamically. Thus, the availability of a candidate MEC system may change as resource availability for processing and memory change. It is understood that in some embodiments, the current inability of a MEC system providing an advertisement message of availability to meet the specific requirements of the compute work request may be a basis of elimination from the list of candidate MEC system in the first place. In other embodiments, the dynamic nature of processing and memory resource availability may involve ongoing reporting of those resources by each candidate MEC system. The edge compute advisory system may monitor the processing and memory capacity of the candidate MEC system reporting their availability. Flow returns to 545 to determine if any additional candidate MEC system are unable to meet a minimum trust level or have insufficient capacity. If no further candidate MEC systems are reporting poor trustworthiness or insufficient capacity, then flow may proceed to 555.

At 555, the edge compute advisory system presents one or more local optimal edge compute partners as available to a client information handling system or to an IoT device requesting edge compute resources. A commitment to work may be obtained from the candidate MEC system that will serve as the optimal edge compute partner that is recommended. Further, the client information handling system may be provided the IP address, corresponding wireless link, and the commitment to work for connection with the recommended one or more optimal edge compute partners. At this point the operation of the edge compute advisory system method may end. It is understood that in an example embodiment the edge compute advisory system may operate via a broker node to assess MEC systems in an area local to the client information handling system. The broker node may service an enterprise-operated edge compute advisory system or may operate to provide for subscriber based edge compute resources for a mobile information handling system client seeking additional local compute resources in various embodiments. Other embodiments may include the edge compute advisory system operating, in whole or in part, on a client information handling system seeking edge compute resources as described in embodiments herein.

Figure 6:
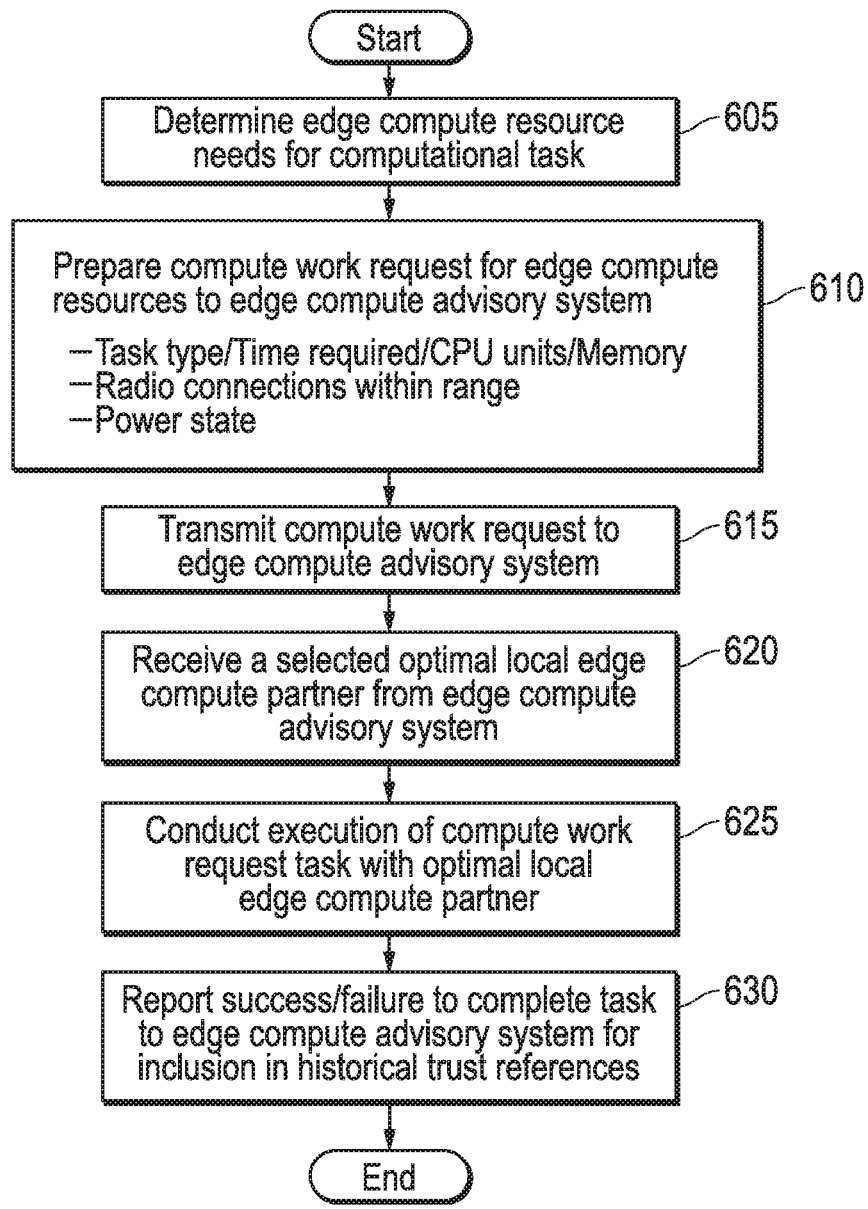
FIG. 6 is a flow diagram illustrating a method of accessing an edge compute advisory system by a client device according to an embodiment of the present disclosure.

FIG. 6 is a flow diagram illustrating a method of a client information handling system accessing a mobile edge compute advisory system at a broker node for determining an optimal edge compute partner according to an embodiment of the present disclosure. At block 605, in an embodiment, a client information handling system may determine a need for edge computing resources to supplement the available computing resources at the client in order to complete a computing task. In some embodiments, such as with a thin client, an IoT device, smart card or other device with limited processing power, having the ability to utilize edge computing resources enables a small, efficient device to be used anywhere but still have powerful computing capabilities above what is on the box of the client information handling system. The client information handling system may execute code of an agent that operates as part of the edge compute advisory system of the present embodiments. The client agent may operate to prepare a compute work request and otherwise work with the edge compute advisory system of the embodiments herein to connect with a local optimal edge compute partner. The client information handling system may then be connected to an optimal edge compute partner to execute a task on behalf of the client information handling system.

At 610, the client information handling system may determine how may CPU units or how much memory is necessary for a computing task. With this data a compute work request may be prepared to seek edge compute resources from a plurality of MEC systems in a local area for the client information handling system. The compute work request may further include additional parameters including a task type, a time in which a computing task must be completed, task priority level, identification of wireless capabilities and wireless link transceivers within range, power state of the client information handling system, and other parameters used to define the compute work request. In a further aspect, a GPS locator or other position determination may be provided along with a compute work request. In some embodiments, various cost factors may also be included such as limitations on charges willing to be paid for edge computing services or trust levels acceptable for the compute task. Several other aspects for defining a compute work request may be prepared as understood.

In an optional embodiment, the client information handling system may provide access to historical trust reference data with respect to dealings of the requesting client information handling system. Thus, as part of a compute work request, encoded information for a secure location to access the historical trust references for the client device or details of access to client device historical trust references may be forwarded separately from the compute work request. For example, a key or other authorization data may be provided to a node or server operating an edge compute advisory system that may be used to decrypt client historical trust reference data at a secure IP address. In an example embodiment, client historical trust references may be used to track payment for edge compute services, reliability of work tasks and communications with MEC systems, security issues or malware instances, or similar issues, if any, related to compute work requests issued by the client information handling system.

Upon determination of a compute work request, the client information handling system may transmit the compute work request to the edge compute advisory system at 615. In a particular embodiment the edge compute advisory system may be operating at a broker node MEC system in some embodiments. In other embodiments, some or all of the edge compute advisory system may operate at a remote server as well.

Proceeding to 620, the edge compute advisory system may provide an identification of one or more optimal edge compute partners that are available to satisfy the compute work request. The identification of the optimal edge compute partner may further include an indication of a commitment to execute the task or tasks of the compute work request from the selected MEC system. The client information handling system may contact the optimal edge compute partner MEC system via the wireless transceiver associated with that MEC system. Data and instructions may be exchanged from the client information handling system while the optimal edge compute partner executes the task or tasks of the compute work request at 625.

At 630 and upon completion of the task or tasks of the compute work request, the client information handling system may determine the success or failure and parameters met to satisfy the edge compute work request tasks. The client information handling system may report the success or failure and any issues or other parameters determined during the execution of the edge compute assistance to satisfy the compute work request. The details of the success or failure to meet the compute work request parameters or any data errors, security problems, malware or other incidents will be reported in a new historical trust reference for inclusion in the historical trust references. In an example embodiment, a new block may be added to the block chained historical trust references associated with the optimal edge compute partner MEC system for future reference by client information handling systems seeking edge compute services. At this point the flow may end.

Figure 7:
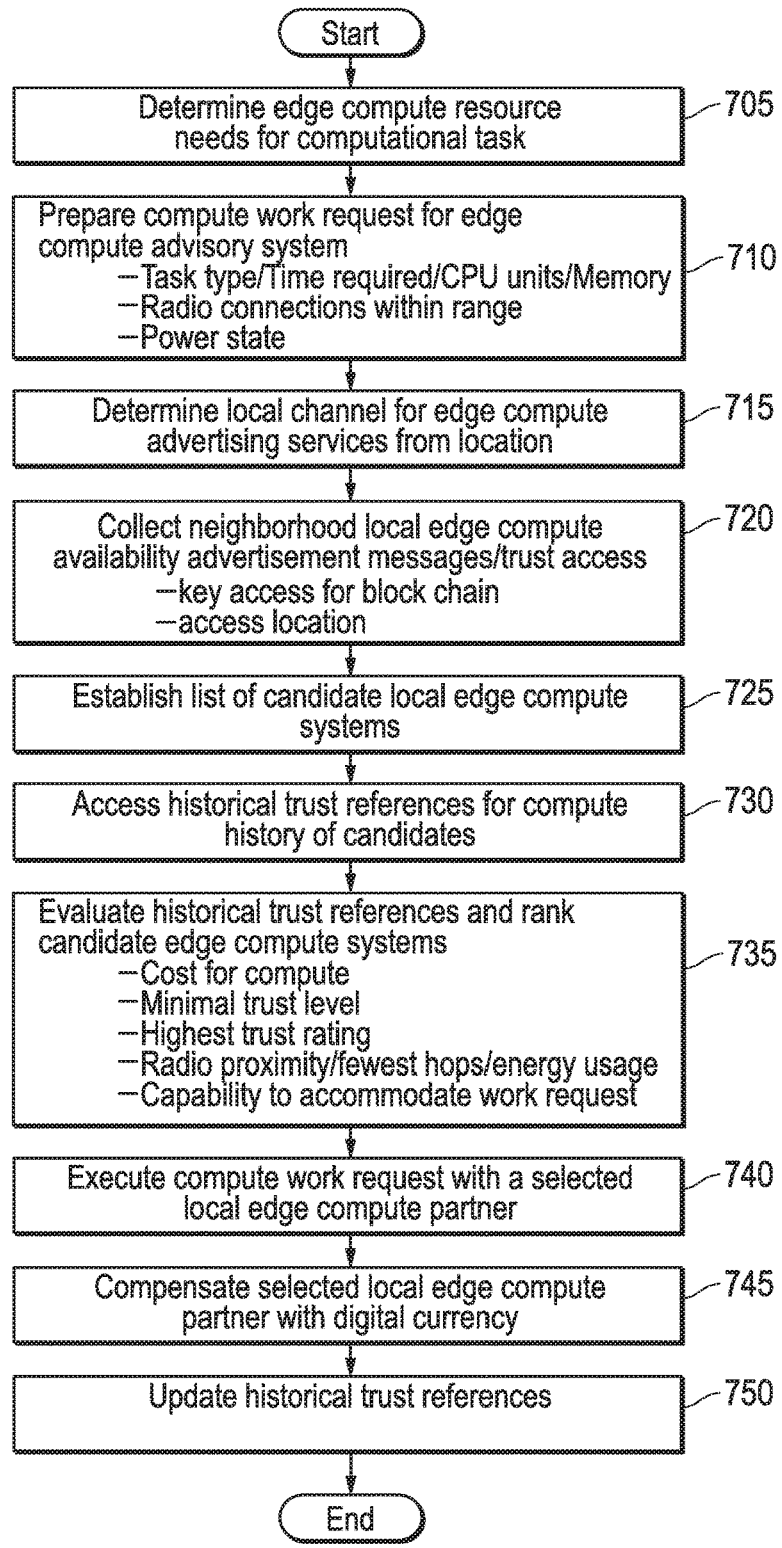
FIG. 7 is a flow diagram flow diagram illustrating a method of operating an edge compute advisory system for compute as a service according to another embodiment of the present disclosure.

FIG. 7 is a flow diagram illustrating a method of implementing a mobile edge compute advisory system to determine an optimal edge compute partner for a client information handling system needing local edge compute resources to supplement computing needs, such as for a thin client device according to an embodiment of the present disclosure. At block 705, in an embodiment, an edge compute advisory system may be operating on the client information handling system. The mobile client information handling system may be issued by an enterprise and execute trusted compute policy received from an enterprise administrative server for determining an optimal edge compute partner in some embodiments. In other embodiments, the mobile client information handling system may be seeking edge computing resources to assist in providing compute power not otherwise available through subscriber-based access to nomadic Compute aaS resources. In such an example embodiment, the mobile client information handling system may be seeking free or low cost edge compute resources as a subscriber to edge compute capabilities. At block 705, the edge compute advisory system is initiated with a determination that edge compute resources are needed for a computational task.

Flowing to 710, the edge compute advisory system will prepare a compute work request for transmission to one or more locally placed MEC systems. In some embodiments, the compute work request may seek edge compute services. In other embodiments, the compute work request may be established to define the parameters around the necessary edge compute work. A beacon or other request signal may be sent to MEC systems seeking indications of availability through advertisement messages in some embodiments. The client information handling system may determine a task type and a task magnitude based on an amount of data that may need to be processed for the computational task needing additional edge compute resources. The task type and magnitude may be cross referenced with a table or other data to predict how may CPU units or how much memory is necessary for this computing task. Further, the client information handling system may determine an expectation of time to complete the computational task. With this data, a compute work request may be prepared to seek edge compute resources from a plurality of MEC systems in a local area of the client information handling system. The compute work request may further include additional parameters including a task priority level which may relate to security level or speed with which the computational task must be completed. Additional considerations will be used to determine CPU units needed, memory needed, or time of completion in some embodiments and will affect how these parameters are derived. Such considerations may include the wireless capabilities and wireless link transceivers within range, the QoS of the connectivity, a power state of the client information handling system, and other parameters in various embodiments. Each of these may affect how much processing is offloaded and will affect later determinations of suitable candidate MEC systems and selection of MEC systems as an optimal edge compute partner.

In one optional embodiment, the client information handling system may provide access to historical trust reference data with respect to dealings of the requesting client information handling system. Thus, as part of a compute work request, encoded information for a secure location to access the historical trust references for the client device or other details to enable access to client device historical trust references may be forwarded. In one aspect, a decryption key or other authorization data may be provided to a selected optimal edge compute partner to decrypt client historical trust reference data at a secure IP address before issuing a commitment to perform work for the requesting client information handling system. In an example embodiment, client historical trust references may be used to track payment for edge compute services, reliability of work task cooperation and communication with MEC systems, security issues or malware instances, or similar issues, if any, related to compute work requests issued by the client information handling system.

The method may proceed to 715 to determine one or more local wireless channels whereby edge compute advertising services may be accessed for MEC systems available to provide edge compute resources. In one example embodiment, the edge compute advisory system may issue the compute work request on one or more wireless channels detected within range of the client information handling system. Those wireless transceivers or access points may have a list of MEC system IP addresses of nearby MEC systems and forward the requests accordingly. One or more MEC systems may respond with an advertisement message that may include identification data, wireless access routes, an indication of availability or non-availablity, currently available processing and memory resources, and security and performance history address data for access to historical trust references. In one aspect, a low authorization requirement may be provided for access to local area transceivers to which a compute work request may be transmitted. In other embodiments, the plurality of MEC systems that provide edge computing may be networked and connected via one or more hops to at least one sink transceiver or a sink transceiver for each type of wireless link protocol. The sink transceiver may provide a wireless link to receive a compute work request from a client information handling system which may then be broadcast to all networked MEC systems. In some embodiments however, connection to the MEC systems may be more directly accessed by a different transceiver linked to that MEC system for executing the requested computational task if that MEC system is selected.

In yet another embodiment at 715, MEC systems may broadcast advertisement messages via one or more local transceivers to an area where a client information handling system is operating. The client information handling system may determine one or more local channels in the area where MEC system advertisement messages are accessible. The MEC system advertisement messages may be broadcast, for example, on a freely accessible WiFi or other protocol channel used such as a generic advertising services channel. In other embodiments, the MEC systems may operate an agent of the edge compute advisory system and some authorization may be required to access the MEC advertisement messages by the client information handling system. In some aspects, the MEC advertisement message are continuously or periodically updated with respect to availability status, amounts of processing and memory resources currently available, wireless connectivity available, costs, and other features that may fluidly change for each MEC system. For example, costs may vary depending on processor or memory occupancy levels to incentivize utilization of a MEC system when activity is slow.

At 720, the edge compute advisory system may collect neighborhood local edge compute availability advertisements as well as historical trust reference accesses for identified available MEC systems. In one embodiment, the collected advertisement messages will be from MEC systems responsive to a compute work request for edge compute services. In other embodiments, the advertisement messages may be received in response to a solicitation message from the client information handling system to prompt responsive advertisement messages from available MEC systems. In yet other embodiments, the edge compute advisory system may receive advertisement messages due to access to a generic advertising services channel and collect advertisement messages from broadcasting MEC systems that are local.

Proceeding to 725, the edge compute advisory system will establish a list of candidate local MEC systems. The overall number of MEC systems providing availability advertisement messages may be pared down to a candidate list of MEC systems. The candidate list of MEC systems may be determined based on limitations on preset tolerance ranges for distance, number of hops, or wireless range. The edge compute advisory system may acknowledge its location and available wireless transceivers within range when determining a preset tolerance range beyond which MEC systems may not be considered. In one aspect, a GPS locator or other position determination may be assessed relative to the MEC systems providing advertisement messages. If a QoS level or connectivity is spotty with a wireless transceiver, it may eliminate a MEC system that is available via that wireless transceiver if no other connection is available to that MEC system. In another aspect, a limitation on the number of hops tolerated among networked MEC systems to access an MEC system may similarly limit the MEC system advertisement messages considered by the edge compute advisory system. MEC systems with access only via wireless link protocols unavailable to the client information handling system may also be eliminated from a candidate MEC system list.

In other embodiments, currently available processing resources or memory resources may not match a compute work request and eliminate some MEC systems. In additional embodiments, various cost factors eliminate MEC systems from a candidate MEC system list including limitations on charges willing to be paid for edge computing services for the compute task. Several other aspects for defining a candidate MEC system list may also be utilized as understood or according to embodiments described herein. Accordingly, several MEC systems that advertise as available may be eliminated from a candidate MEC system list for further consideration or rating by the edge compute advisory system under various embodiments.

With a candidate MEC system list of local MEC resources, flow may proceed to 730 where the edge compute advisory system may access historical trust references to determine if candidate MEC systems meet acceptable trust level categories or trust level ratings. The client information may access a secure IP address location indicated by the MEC advertisement message as containing a historical trust record. In an example embodiment, the historical trust record at the IP address location may be encoded or encrypted. The client information handling system may present a first access credential or an encrypted token key. The first access credential in an embodiment may be some form of access identification, including, but not limited to a password, a username, or an asymmetric key, or any other type of authorization known in the art to access the historical trust references for a corresponding MEC system. In one example embodiment, the historical trust references may be stored as block chained data accessible with an encrypted token key. Further, the client information handling system requesting edge compute services may use the encrypted token to decrypt the block chain of historical trust references associated with the MEC system. Data mining services may be utilized by aspects of the edge compute advisory system to prepare block chains of the historical trust references provided by previous edge compute experiences with an MEC system. Those trust reference events are independently stored outside of control or influence by the candidate MEC system. The block chain encryption is highly secure and substantially protected from hacking or unauthorized tampering. Similarly a secure IP address may be a monitored database operating an agent of the edge compute advisory system and may monitor sources and times when historical trust references are provided or any accesses or modifications are made to the same. Thus, a record may be made of the trust history independent of the candidate MEC system in various embodiments.

The edge compute advisory system may access a plurality of historical trust references for each of the candidate MEC systems on the list. In some embodiments, the list may be limited by an administrator such that only a limited number of MEC systems are considered when a large number of suitable candidates are found. In this way a limit may be set on the processing required to execute the edge compute advisory system of the client information handling system. The limit on number of listed candidate MEC system may be made on several criteria. For example, a first come first serve basis may be used. In other embodiments, a large response of available candidate MEC system may cause in increased scrutiny on the factors above used to pare down the MEC systems available. For example, the preset tolerance range may be reduced to only consider candidate MEC systems that have higher wireless quality or even fewer hops in some embodiments.

Proceeding to 735, the edge compute advisory system will evaluate the candidate MEC systems according to historical trust references and several other factors. A threshold may be used for one or more factors by the edge compute advisory system in designating one or more candidate MEC systems to be an optimal edge compute partner recommended to the client information handling system.

The edge compute advisory system may evaluate the historical trust references for each candidate MEC system. In doing so, the edge compute advisory system may flag any instances of failure to complete compute work requests, any reported incidents of security breaches or introduction of malware, any reported errors or time out episodes, reported payment problems or fraud, or other significant problems identifiable with the provision of the edge compute services. In one example embodiment as described above, one or more instances of the above type events may place the candidate MEC system in an untrustworthy category, especially if they are recent, and in the case of malware it is not known to have been contained. No reported events, such as the above events, may place the candidate MEC system in a high trustworthy category by the edge compute advisory system.

In other embodiments, a series of trustworthiness category levels may be determined by the edge compute advisory system. Factors such as the type of reported event may determine which of several trustworthiness category levels may be designated. Further, age of reported events may suggest that the problem has been corrected or repeated reports of the same problem may suggest an ongoing issue which may affect which trustworthiness category is assigned. For example, a reported payment issue/fraud, security breach or malware introduction, or a failure to complete compute work requests that is very recent may yield among the lowest trustworthiness categorizations. If on the other hand, a MEC system that has once been subject to malware but the malware incident is older or is known to have been neutralized, then this may yield one or more of the medium trustworthiness categorizations. In another example embodiment, a data error or failure to complete a contract compute task is reported but also has been reported to be fixed or enhanced with additional resources. In such an example, this may also yield one or more of the medium trustworthiness categorizations. In some embodiments, a candidate MEC system may provide response solution reports to poor ratings in its historical trust references which may lend to improved trustworthiness categorizations in some embodiments. In yet another example, failure to complete a requested task within an allocated time may be substantial for high priority tasks but less substantial for low priority tasks and thus may still yield a higher trustworthiness categorization but perhaps not the highest trustworthiness level. Other factors may be included in determining the trustworthiness categorization for an MEC system derived from the accessed historical trust references.

In another embodiment, the edge compute advisory system may create a trustworthiness rating from the historical trust references records for each candidate MEC for comparison. The trustworthiness rating may be established through application of any algorithm to assess performance of the candidate MEC system. Normalization and weighting factors may provide for comparison of various edge compute performance metrics.

As described in embodiments herein, the edge compute advisory system may create a trustworthiness rating from the historical trust references records for each candidate MEC for comparison and determination of an optimal edge compute partner. The trustworthiness rating may be established through application of any algorithm to assess performance of the candidate MEC system as determined from the historical trust references as well as current capabilities or operating states/locations of the candidate MEC system and the client information handling system. Normalization and weighting factors may provide for comparison of various edge compute performance metrics received in the historical trust references or factors of operation or communication status of the candidate MEC system.

In an example embodiment, a percentage of on-time completion of contracted compute tasks relative to a total number of contracted compute tasks performed by a MEC system may be assessed. This on-time completion percentage value may serve as trustworthiness rating value in one example embodiment. For example, a trustworthiness rating value may be a value out of 100 or rated up to 10 based on the percentage of on-time completion in some embodiments. Such a trustworthiness rating may be calculated after at least a minimum level of trustworthiness has been met. For example, the trustworthiness rating determination may also require that all contracted compute tasks reported as performed by the MEC system have occurred without error and without security incidents. For example, recent malware or security breach incidents or a recent failure to complete a contracted compute task may eliminate the candidate MEC system from consideration. In another example embodiment, the edge compute advisory system may need to determine that the candidate MEC system may at least meet the minimum processing and memory criteria of the compute work request before assessing trustworthiness rating value.

In one example embodiment, trustworthiness rating value may be weighted or modified by factors such as compute location proximity (as determined by wireless connectivity quality or number of hops), cost levels, trust trends relative to prior trustworthiness score, or an abundance of current processing capability or memory resources. To apply multiple weighting values, the factors may be normalized at various levels depending on the attributed importance in the trusted compute policy implemented by the edge compute advisory system. The trusted compute policy may be provided to a client information handling system by an enterprise administrative server in some embodiments or may be provided as default in other embodiments which may be modifiable by a user or administrator.

Several example embodiments of factors in determining an optimal edge compute partner may be used as weighting factors in influencing the resulting trustworthiness rating value or a trust trend value as determined by the edge compute advisory system. Several example embodiments are discussed herein of factors assessed. In one example embodiment, the trustworthiness rating value may be weighted by the application of a cost weighting factor. A free computing service may be given the least impact or no impact on reducing the trustworthiness rating value in one example embodiment. A high cost MEC system may have a greater impact on reducing the trustworthiness rating value. For example, a rating value divisor may be applied to the trustworthiness rating value. The divisor may be determined as a weighting factor across a spectrum of cost levels for candidate MECs from lowest cost to highest cost for edge computing services. In an example embodiment, the divisor weighting value may be applied as a divider of one for a lowest cost MEC system, thus having no effect. The divisor weighting factor for higher costs MEC systems may be applied as a divisor weighting factor of one plus the cost of the lowest cost candidate MEC system divided by the candidate MEC system. In such an example embodiment, free edge computing services would need to be provided a minimum cost value or assigned a weighting divisor of one. It is understood that other algorithms may be applied to weight the determination of a trustworthiness rating value or a trust trend value according to a trusted compute policy implemented by the edge compute advisory system. A user or administrator may be able to modify the trusted compute policy to emphasize or de-emphasize aspects in some embodiments as necessary. Further other factors as discussed in embodiments herein may be applied as weighting factors as desired.

The requesting client information handling system may determine one or more optimal edge compute partners based at least on whether the candidate MEC systems meet a minimum trust level such as a threshold trustworthiness categorization or a minimum threshold trustworthiness rating. In another embodiment, the edge compute advisory system may select one or more optimal edge compute partners based on candidate MEC systems that have the highest trustworthiness category or trustworthiness rating. Those with lowest trustworthiness ratings may be eliminated from consideration for edge compute services.

Additional aspects may be considered by the mobile edge compute advisory system. For example, ranking of an optimal edge compute partners may be made according to radio proximity to the client information handling system or fewest hops. This selection may ensure a close MEC system to minimize latencies. In some further embodiments such as mobile client devices with a reported low power state, the highest QoS wireless link or the MEC least likely to have wireless latency may be selected to minimize power expended by the client information handling system. The energy cost in communicating with the selected optimal edge compute partner when the compute work is being conducted may be minimized for low power client information handling systems.

In yet other embodiments, such as in a Compute aaS setting, the ranking may be influenced based on lowest cost to utilize the edge compute services. As long as a minimum level of trustworthiness is met according to the trusted compute policy implemented by the edge compute advisory system, then ranking of candidate MEC systems for selection as an optimal edge compute partner may be based from a lowest to highest cost to compute. A lower cost would be associated with a higher ranking. This assumes a cost weighting factor was not already used in determining a trustworthiness rating value or trust trend value.

In one embodiment, a comparison between the current capacity of the candidate MEC to meet the requirements of the compute work request is made. A system with additional CPU units or memory capacity above the minimum requested amounts may be higher ranked due to the ability to utilize additional resources to timely meet the computing task if needed. Thus, in some embodiments, a ranking of candidate MEC systems may be made or adjusted based upon the current compute or memory resources available at the candidate MEC. If resources above the level requested by the compute work request are available, then the candidate MEC system may be provided as a priority optimal edge compute partner in some embodiments.

Upon determination of the trustworthiness categorization or trustworthiness algorithmic rating by the edge compute advisory system including factors such as cost, proximity, capability to accommodate the compute request and other factors, the edge compute advisory system may rank or identify one or more optimal edge compute partners to be used by the client information handling system.

At determining at least one suitable optimal edge compute partner, flow may proceed to 740 for selection of one or more optimal edge compute partners to satisfy the compute work request tasks. The client information handling system may access the one or more optimal edge compute partner MEC systems and provide the data and instructions necessary for execution of the tasks thereon. The client information handling system may remain in communication with the optimal edge compute partner or partners as needed, and receive the result of the completed computing task or tasks assigned if successfully completed.

At 745, the client information handling system may be a subscriber to Compute aaS services and have a digital wallet or access to a digital wallet. Electronic payment maybe provided to the MEC system that provided the compute work from the digital wallet of the client information handling system. Further, the client information handling system may additionally compensate the data miners who provide block chaining services to secure historical trust references. In other aspects, the MEC system receiving electronic payment may share portions of payment with the data miners to support block chaining of historical trust references to maintain security of the MEC systems trust history. It is understood that several forms of electronic currency may be used including crypto-currencies such as bitcoin or ethereum to pay for edge compute services as well as for block chaining security.

Proceeding to 750, the client information handling system will determine via the edge compute advisory system whether the time of completion has been satisfied, whether data errors have been detected, whether there have been difficulties in communication, whether there were incidents of security issues or malware, or other factors according to embodiments herein. The details of the original compute work request may be provided as well. Several aspects may be prepared as part of a historical trust reference entry for the selected optimal edge compute partner. In an embodiment, the edge compute advisory system may update the historical trust references at the secure IP address by providing a report of the performance of the MEC system as a selected optimal edge compute partner to conduct the requested compute work. In an example embodiment, the server or storage location may implement data mining to add a block to the block chain of historical trust references to include the reported trust reference report of the recently completed work. In other embodiments, other types of encryption or security measure may be used to secure the new trust reference report within the historical trust references as understood. At this point, the method may end.

The blocks of the flow diagrams of FIGS. 5-7 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram. Aspects of several described embodiments herein may be implemented with the embodiments described in any of the FIGS. 5-7 described.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating an edge compute advisory system comprising:
a network adapter to receive a compute work request from a client device seeking edge computing resources of a mobile edge computing system, wherein the compute work request includes processing resource requirements to meet the compute work request;
a processor to determine a plurality of mobile edge computing systems within a neighborhood range of an estimated client device location;
the network adapter to receive advertisement messages indicating availability of the plurality of mobile edge computing systems and including an address location for secured historical compute trust references for each advertising mobile edge computing system;
the processor executing machine readable executable code instructions of the edge compute advisory system to:
associate a first credential with a block chain of historical trust references wherein each block in the block chain include a time-stamped record of a compute delivery in response to compute requests, and decrypt and access the historical trust references for a plurality of candidate mobile edge computing resources accessible to the client device location; and
determine an optimal candidate mobile edge computing resources partner from among the plurality of candidate mobile edge computing systems based on a minimal level of trust category or rating for the mobile edge computing system.

2. The information handling system operating the edge compute advisory system of claim 1, wherein the processing resource requirements to meet the compute work request includes a designation of minimum CPU core units required, a minimum level of memory available, or a time of completion required.

3. The information handling system operating the edge compute advisory system of claim 1 further comprising:
the processor selecting the optimal candidate mobile edge computing resources partner to execute the compute work request.

4. The information handling system operating the edge compute advisory system of claim 1 further comprising:
a memory for receiving a plurality of block chains of the historical compute trust references for the plurality of mobile edge computing systems and
access the historical trust references for the plurality of candidate mobile edge computing systems.

5. The information handling system operating the edge compute advisory system of claim 4 further comprising:
the network adapter receiving an indication of a completion of the compute work request including time taken and status of completion; and
the processor executing machine readable executable code instructions of the edge compute advisory system to add a block of a time-stamped record of a compute delivery in response to the compute work request to the block chain of historical trust references for the optimal candidate mobile edge computing system.

6. The information handling system operating the edge compute advisory system of claim 5 further comprising:
the processor executing code instructions to:
determine a normalized trust criteria rating for the completed compute work request based on the time taken and status of completion relative to the processing resource requirements received to meet the compute work request.

7. The information handling system operating the edge compute advisory system of claim 1, wherein the determining the optimal candidate mobile edge computing resources partner is further based on an ability for the mobile edge computing system to currently accommodate the processing resource requirements of the compute work request.

8. The information handling system operating the edge compute advisory system of claim 1 further comprising:
the processor to determine the optimal candidate mobile edge computing resources partner from among the plurality of candidate mobile edge computing systems further based a trust category ranking or a normalized trust criteria rating generated from recorded completion, errors, completion time, or security issues in the historical trust references.

9. The information handling system operating the edge compute advisory system of claim 1 further comprising:
the processor executing code instructions to:
designate a mobile edge computing system as unavailable for compute work requests if the historical trust references for that mobile edge computing system do not meet a minimum threshold rating.

10. A method of operating an edge compute advisory system comprising:
receive a compute work request via a network adapter from an IoT device seeking edge computing resources of a mobile edge computing system, wherein the compute work request includes processing resource requirements to meet the compute work request;
determining a plurality of mobile edge computing systems within a neighborhood range of an estimated client device location;
receiving advertisement messages for availability of the plurality of mobile edge computing systems and including an address location for secured historical compute trust references for each advertising mobile edge computing system;
executing machine readable executable code instructions, via a processor, of the edge compute advisory system to:
associate a first credential with a block chain of historical trust references wherein each block in the block chain include a time-stamped record of a compute delivery in response to compute requests, and decrypt and access the historical trust references for the plurality of candidate mobile edge computing that sent advertisement messages indicating availability; and
determine an optimal candidate mobile edge computing resources partner from among the plurality of candidate mobile edge computing systems based on a trust category level or a normalized trust criteria score generated from recorded completion, errors, completion time, or security issues in the historical trust references.

11. The method of operating the edge compute advisory system of claim 10 further comprising:
determining the optimal candidate mobile edge computing resources partner from among the plurality of candidate mobile edge computing systems further based on an ability for the optimal mobile edge computing resources partner to currently accommodate the processing resource requirements of the compute work request.

12. The method of operating the edge compute advisory system of claim 10, wherein determining the optimal candidate mobile edge computing resources partner is further based on a minimal power consumption to communicate between the mobile edge computing system and the client device.

13. The method of operating the edge compute advisory system of claim 10 further comprising:
determining a trust category level or a normalized trust criteria rating for the completed compute work request based on a received trust compute policy with respect to performance factors for mobile edge computing system; and
adding the trust category level or the normalized trust criteria rating to the historical trust references for the optimal candidate mobile edge computing resources partner.

14. The method of operating the edge compute advisory system of claim 10 further comprising:
selecting a local channel for communication of advertisement messages from the plurality of mobile edge computing systems to the edge compute advisory system.

15. An information handling system operating an edge compute advisory system comprising:
a network adapter to select a local channel for communication of advertisement messages to an edge compute advisory system;
a processor to determine a plurality of mobile edge computing systems within a neighborhood range of the information handling system;
the network adapter to send a compute work request seeking edge computing resources, wherein the compute work request includes processing resource requirements to meet the compute work request;
the network adapter to receive advertisement messages for availability of the plurality of available mobile edge computing systems wherein at least some of the mobile edge computing systems are subscriber-based edge computing resources;
a processor executing machine readable executable code instructions of the edge compute advisory system to:
associate a first credential with a block chain of historical trust references wherein each block in the block chain include a time-stamped record of a compute delivery in response to compute requests, and decrypt and access the historical trust references for the plurality of candidate mobile edge computing resources; and
determine an optimal candidate mobile edge computing resources partner from among the plurality of candidate mobile edge computing systems based on a minimal level of trust category level for the mobile edge computing system.

16. The information handling system operating the edge compute advisory system of claim 15, wherein the determining the optimal candidate mobile edge computing resources partner is further based on an overall cost level to access the mobile edge computing system.

17. The information handling system operating an edge compute advisory system of claim 15, further comprising:
the network adapter accessing a block chain of a historical compute trust references for one or more candidate mobile edge computing systems at a web address, each block in a block chain including a time-stamped record of a compute delivery in response to compute requests; and
the processor to associate a first credential with the block chain of historical trust references, and decrypt the historical trust references.

18. The information handling system operating the edge compute advisory system of claim 15,
further comprising:
the processor to send compensation for provision of the optimal candidate mobile edge computing resources partner from a digital wallet as compensation for the compute work request completion by the optimal candidate mobile edge computing resources partner.

19. The information handling system operating the edge compute advisory system of claim 15,
further comprising:
the processor to send compensation to data miners who process the historical compute trust references in block chains from a digital wallet.

20. The information handling system operating the edge compute advisory system of claim 15 further comprising:
the network adapter establishing an indication of a completion of the compute work request including time taken and status of completion of the compute work request for inclusion as a historical trust references entry for the optimal candidate mobile edge computing system.

* * * * *